(12) United States Patent
Fatherazi et al.

(10) Patent No.: US 11,255,452 B2
(45) Date of Patent: *Feb. 22, 2022

(54) STABILIZED VALVE WITH GUIDE

(71) Applicant: Sartorius Stedim Biotech GmbH, Goettingen (DE)

(72) Inventors: Shahmir Fatherazi, Aachen (DE); Ralf Lausch, Goettingen (DE); Thomas Loewe, Goettingen (DE); Ellen Schuessler, Holzerode (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 65 days.

This patent is subject to a terminal disclaimer.

(21) Appl. No.: 16/535,461

(22) Filed: Aug. 8, 2019

(65) Prior Publication Data

US 2019/0360607 A1    Nov. 28, 2019

Related U.S. Application Data

(63) Continuation of application No. 14/986,784, filed on Jan. 4, 2016, now Pat. No. 10,415,718, which is a (Continued)

(30) Foreign Application Priority Data

Jul. 3, 2013  (DE) .......................... 202013102908.4

(51) Int. Cl.
*F16K 27/08*        (2006.01)
*F16K 31/528*       (2006.01)
(Continued)

(52) U.S. Cl.
CPC .............. *F16K 27/08* (2013.01); *F16K 31/50* (2013.01); *F16K 31/5286* (2013.01); *B65D 47/263* (2013.01)

(58) Field of Classification Search
CPC ..... F16L 37/113; F16L 37/107; F16L 29/002; B65D 47/261; B65D 47/266;
(Continued)

(56) References Cited

U.S. PATENT DOCUMENTS 2,800,912 A ‡ 7/1957 McCamish ............. F16K 17/16
                                              114/183 R
3,184,091 A ‡ 5/1965 Hoffman ............... B65D 39/082
                                              217/99

(Continued)

FOREIGN PATENT DOCUMENTS

DE      8907185 U1 ‡  7/1989  ............ A61M 39/26
DE      8907185 U1    7/1989

(Continued)

OTHER PUBLICATIONS

International Search Report in counterpart International Application No. PCT/EP2014/001480, dated Sep. 16, 2014.‡

(Continued)

*Primary Examiner* — Craig J Price
*Assistant Examiner* — Andrew J Rost
(74) *Attorney, Agent, or Firm* — Edell, Shapiro & Finnan LLC

(57) ABSTRACT

A valve includes a longitudinally movable valve body that is arranged in the valve, wherein the valve housing has at least two guide grooves, with which auxiliary guide elements, arranged on the valve body, engage an exterior surface of the valve housing. The guide grooves of the valve housing are shaped such that they define a combined translatory and rotary movement path of the valve body with the aid of the auxiliary guide elements in order to open or close the valve.

20 Claims, 4 Drawing Sheets

Related U.S. Application Data continuation of application No. PCT/EP2014/001480, filed on Jun. 2, 2014.

(51) Int. Cl.
*F16K 31/50* (2006.01)
*B65D 47/26* (2006.01)

(58) Field of Classification Search
CPC ............... B65D 47/263; B65D 47/283; B65D 47/2031; F16K 31/504; F16K 31/5286; F16K 31/50; F16K 27/08
See application file for complete search history.

(56) References Cited

U.S. PATENT DOCUMENTS

| | | | | |
|---|---|---|---|---|
| 3,434,694 | A ‡ | 3/1969 | Skinner | F16K 1/04 137/315.27 |
| 4,475,670 | A ‡ | 10/1984 | Rutter | B65D 77/067 222/105 |
| 4,597,581 | A ‡ | 7/1986 | Nimberger | F16J 15/32 251/214 |
| 4,619,377 | A ‡ | 10/1986 | Roos | B67B 7/26 222/129 |
| 4,942,901 | A ‡ | 7/1990 | Vescovini | A61M 39/26 137/27 |
| 4,976,381 | A ‡ | 12/1990 | Scholle | B65D 21/0231 220/303 |
| 5,118,015 | A ‡ | 6/1992 | Scholle | B65D 21/0231 222/397 |
| 5,435,339 | A ‡ | 7/1995 | Hayes | F16K 31/528 137/315.04 |
| 6,997,441 | B2 ‡ | 2/2006 | Yang | B65D 47/2031 251/284 |
| 7,681,764 | B2 ‡ | 3/2010 | Nini | B67D 3/047 222/153.05 |
| 8,056,903 | B2 ‡ | 11/2011 | Matsui | C08G 18/10 277/439 |
| 8,387,837 | B2 ‡ | 3/2013 | Bellmore | B67D 3/0058 222/505 |
| 9,212,750 | B2 ‡ | 12/2015 | Blake | F16K 3/265 |
| 10,415,718 | B2 * | 9/2019 | Fatherazi | F16K 31/5286 |
| 2004/0135113 | A1 ‡ | 7/2004 | Roos | B67D 3/045 251/265 |
| 2006/0243942 | A1 ‡ | 11/2006 | Liepold | F16K 1/12 251/36 |
| 2009/0229671 | A1 ‡ | 9/2009 | Hartnett | F16K 1/12 137/13 |
| 2011/0253233 | A1 ‡ | 10/2011 | Hillier | F16K 1/12 137/56 |

FOREIGN PATENT DOCUMENTS

| | | | | |
|---|---|---|---|---|
| DE | 19901654 A1 ‡ | 8/2000 | ................ | F16K 1/12 |
| DE | 19901654 A1 | 8/2000 | | |
| EP | 0691492 A1 ‡ | 1/1996 | ............... | F16K 1/12 |
| EP | 0691492 A1 | 1/1996 | | |
| EP | 2292297 A1 ‡ | 3/2011 | ............ | A61M 39/10 |
| EP | 2292297 A1 | 3/2011 | | |
| FR | 2978225 A1 ‡ | 1/2013 | ............ | F16K 3/265 |
| WO | 03090843 A1 | 11/2003 | | |
| WO | WO-03090843 A1 ‡ | 11/2003 | ............ | A61M 39/10 |

OTHER PUBLICATIONS

International Preliminary Report on Patentability and Written Opinion in counterpart International Application No. PCT/EP2014/001480, dated Jan. 5, 2016.‡

\* cited by examiner
‡ imported from a related application

STABILIZED VALVE WITH GUIDE

CROSS REFERENCE TO RELATED APPLICATIONS

This is a Continuation of U.S. patent application Ser. No. 14/986,784, filed Jan. 4, 2016, now U.S. Pat. No. 10,415, 718, which is a Continuation of International Application PCT/EP2014/001480, which has an international filing date of Jun. 2, 2014, and the disclosure of which is incorporated in its entirety into the present Continuation by reference. The following disclosure is also based on and claims the benefit of and priority under 35 U.S.C. § 119(a) to German Patent Application No. DE 20 2013 102 908.4, filed Jul. 3, 2013, which is also incorporated in its entirety into the present Continuation by reference.

FIELD OF THE INVENTION

The present invention relates to a valve comprising a longitudinally movable valve body that is arranged in the valve, wherein the valve housing has at least two guide grooves, with which auxiliary guide elements, which are arranged on the valve body, engage on an exterior surface of the valve housing. The guide grooves are shaped to define a combined translatory and rotary movement path of the valve body with the aid of the auxiliary guide elements in order to open or close the valve.

BACKGROUND

Valves are generally defined as components that are used for shutting off or regulating the flow of fluids (liquids and gases). For this purpose the flow is interrupted or reduced using a closing member, the valve body, such that the closing member totally or partially closes the opening through which the fluid flows. Therefore, such valves are suitable not only for shutting off material flows, but also for controlling fluid flows.

In most valves the opening and closing takes place by a movement of the valve body inside a valve housing. In this context US 2009/0229671 A1 discloses a disposable connector, which is designed for the sterile transfer of fluids and in which the movement of the valve body is selectively guided and limited. This type of guided movement is known from so-called bayonet locks. For this purpose a kind of nub, cone or pin is moved in a guide slot or a guide groove in order to open and close the valve. As a result, a rotational motion is associated with a movement in the axial direction. In this case the nubs are used for both the guided movement as well as for the fixation of the valve body inside the valve housing.

EP 2292297 A1 discloses a valve, which in the closed state is connected to the valve body by a mandrel on the valve housing. Thus, the mandrel is used as an additional safeguard in order to hold the valve in the closed state. Similar to US 2009/0229671 A1, the valve, according to EP 2292297 A1, is moved in a guided manner between the closed and the opened state with a type of bayonet lock.

Depending on the use of the valve, however, different demands are made of the functional parameters. In the case of the passage valves described above, it may happen that when the valve body is subjected axially to an excessive amount of pressure, the valve body is pressed out of the valve housing despite the guide nubs. Moreover, many bayonet guides, especially if they are operated by hand, do not allow a single flowing movement, since the valve body is moved inside the valve housing with a complicated process of rotating and pulling at the valve outlet.

SUMMARY

Therefore, an object of the present invention is to provide a valve, with which the drawbacks, known from the prior art, are avoided or at least significantly reduced.

This object is achieved, according to one formulation of the invention, by a valve comprising a valve housing and a longitudinally movable valve body that is arranged in the valve housing, wherein the valve housing has at least two guide grooves, with which auxiliary guide elements, which are arranged on the valve body, engage on an exterior surface of the valve housing, and wherein the guide grooves are shaped to define a combined translatory and rotary movement path of the valve body and the auxiliary guide elements to open or close the valve.

In contrast to valve bodies in the form of hollow pistons, the present valve body preferably has a continuous bore from the valve outlet to the end face. The continuous bore has a constant cross section over the entire length, a decreasing cross section towards the end face, or a decreasing cross section towards the valve outlet.

The term "auxiliary guide elements" is defined as any type of auxiliary elements that can be attached to the valve body and that can engage with the guide grooves. As a result, the valve body is prevented from being unscrewed or pulled out. In addition, the externally mounted auxiliary guide elements also provide a lever, which leads to greater stability of the entire valve. In a manually operable embodiment the lever also results in improved operability, since the operating area is enlarged by the lever. The auxiliary guide elements may be connected to the valve body through the guide grooves, or they may also lie freely in the guide groove at a slight distance from the valve body and may be connected to the valve body only on the outlet side of the valve.

Another positive effect of the auxiliary guide elements is that even if the pressure on the end face of the valve body is higher, the valve body is prevented from being blasted out of the valve housing. In this case precisely the special arrangement of the auxiliary guide elements externally on the valve body has proven to be a safeguard that holds the valve body in the housing when pressure is applied to the valve. This positive effect occurs especially when the end face of the valve body is closed and when the connection of the auxiliary guide elements is closed by the guide grooves.

In this context the term "guide grooves" is defined as the openings in the valve housing, with which the auxiliary guide elements engage. The guide grooves may be formed as grooves or slots. Thus, an elongated recess is referred to as a classic groove, while a slot represents a continuous opening in the valve housing. Correspondingly the guide grooves are formed as recesses or slots.

However, the shape is specified in so far that the resulting guided movement of the valve body always results in a combined translatory and rotary movement. A rigid body has typically, relative to a reference system, six possible movements, so-called degrees of freedom. Of the 6 possible degrees of freedom of motion, i.e. 3 translatory and 3 rotary, they are limited, depending on the task of a valve, in various ways, so that axial guides or threads represent the conventional measures. However, these measures usually lead to an undesired complexity of the device and mean an additional effort in the production. Therefore, another advantage of the present invention is that the degrees of freedom of motion can be limited by a combined translatory and rotary movement with the aid of the auxiliary guide elements and result in a directed movement of the valve body. In an additional embodiment the rotary movement of the valve body occurs at an angle 120°, preferably between 30° and 90°, even more highly preferred between 40° and 70°, wherein the endpoints are included. However, this feature also depends on the exact number and arrangement of the guide grooves in the valve housing and the auxiliary guide elements on the valve body. Moreover, the material and the specific application also represent significant criteria.

In addition, the closed guide within the groove no longer permits any wedging or jamming, a feature that in turn represents a huge improvement. It is particularly advantageous that the movement of the valve body occurs in both a translatory and rotary manner at the same time. Prototype models of the inventive valve functioned in such a way that upon opening the valve, the valve body was moved in a rotary manner in a first movement step and was then pulled out in the axial direction in a second step movement. Just the sum of two movement steps alone is much less convenient in terms of both the operability as well as the risk of jamming or wedging than the solution according to the invention, in which only a combined flowing movement occurs. This feature in turn has an additional positive effect on the operability, because the valve body is much easier to move.

In one embodiment the valve housing has reinforced material regions around the guide grooves. This reinforcement can be designed, for example, in the form of a bead around the edge of the groove. The result is an elevation in the edge region, which leads to both a stabilization of the groove itself and to a stabilization of the auxiliary guide elements that are arranged movably in the groove. As an alternative, the entire periphery of the valve housing can be reinforced in the region of the guide grooves.

In another embodiment of the present invention the valve body has additional auxiliary guide elements, which engage with the guide grooves from the inside (i.e., on an interior surface of the valve housing) and are arranged opposite the auxiliary guide elements engaging from the outside (i.e., on an exterior surface of the valve housing). For this purpose these additional auxiliary guide elements are firmly connected to the valve body and, depending on the size and material of the valve, are firmly connected to the valve body either before introducing the valve body into the valve housing, or are mounted on the valve body from the outside through the guide groove after inserting the valve body into the valve housing. Depending on the material and size of the valve, the additional auxiliary guide elements can be glued, sprayed, screwed or fastened in some other way to the valve body. As an alternative, the additional auxiliary guide elements form, together with the valve body, a manufacturing unit, for example, for injection molded parts made of a synthetic plastic material.

Owing to the additional auxiliary guide elements, which are arranged from the inside, the valve is even more stable, and the guide of the valve body inside the housing is supported from the inside. At the same time the outer and inner auxiliary guide elements can impinge on each other inside the guide groove or can be slightly spaced apart, or can be arranged side by side in the groove in such a way that they are slightly offset. This feature also depends on the material and the size of the valve.

In a preferred embodiment the additional auxiliary guide elements have a nub shape. In this context the term "nub shaped" is understood to mean a small, preferably rounded or cylindrical elevation. Therefore, cones or pins are also possible as the additional auxiliary guide elements. The only feature that all of these shapes have in common is that they lend themselves well to a flowing movement inside the guide groove. Moreover, the valve body is held in the guide grooves by the additional auxiliary guide elements.

In another embodiment the valve body comprises a valve outlet, and the auxiliary guide elements have a stable connection with the valve body at least on the side facing the valve outlet. In this case, too, the type of connection in turn largely depends on the size and material of the valve. The valve outlet is shaped according to the desired ports, so that either a hose or a tube can be connected. Even the valve inlet may be formed as a function of the design. However, the inventive valve is used preferably for containers and is structurally integrated into these containers, so that the valve inlet is located on the inside of the container.

In a preferred embodiment the stable connection between the auxiliary guide elements and the valve body comprises a welded connection, a screw connection, a clip connection or a positive locking connection. For valves made of a synthetic plastic material, welded or glued connections are preferred. As an alternative, the valve body can be manufactured together with the auxiliary guide elements as injection molded parts and are, thus, seen as a structural unit. When the valves are made of harder materials, for example, stainless steel, the connections between the auxiliary guide elements and the valve body are made preferably as screw or plug connections. It is also possible to make the clip connections not only of a synthetic plastic material, but also of other materials.

In another embodiment the auxiliary guide elements consist respectively of up to 3 parts. Both the auxiliary guide elements, which engage with the guide grooves from the outside, and the additional auxiliary guide elements can be present as, for example, separate components and can be connected to the valve body withscrews, pins, clamps, clips or other additional components.

Depending on the material of the entire valve, the design consisting of several parts may represent a particularly preferred design. In the case of valves made of stainless steel it is not possible to push the valve body with the auxiliary guide elements into the valve housing due to the lack of flexibility of the material. Therefore, the three-part construction is particularly suitable for embodiments in stainless steel. In this context a preferred embodiment provides dispensing with the additional auxiliary guide elements from the inside, because the auxiliary guide elements, which are attached from the outside, are connected to the valve body through the guide grooves, for example, using a mandrel or a screw connection. For this purpose a thread or an opening is provided on the valve body, and the screw can be introduced into the thread or the pin can be introduced into the opening from the outside. As a result, additional auxiliary guide elements are eliminated.

In an additional embodiment the valve includes a valve chamber, which is sealed towards the outside by two seals in the closed state. Thus, in the closed state the seals ensure that the valve chamber is open only towards the interior of the housing. Conversely, access to the outside is provided by opening the valve. Thus, in the open state the seal that lies further away from the valve outlet is exposed, while the seal that lies closer to the valve outlet seals off the valve chamber towards the outside.

In a preferred embodiment the seals are applied to the valve body in the multi-component injection molding system. Thus, the two seals are formed almost directly on the valve body and at the same time are united to form a single component. In the case of sealing rings that are otherwise conventional, these sealing rings can easily interlock inside the valve housing due to the mechanical load when opening and closing. In contrast, the one-piece design, in which the valve chamber is mounted on the valve body together with the two seals as an injection molded part, does not provide an engagement surface that would enable an interlocking or displacement of the seals.

In another embodiment the valve is made of a synthetic plastic material. In a particular embodiment the valve is made of one or more thermoplastics, selected from the group of polyethylene (PE), high density polyethylene (HDPE), polypropylene (PP), polyvinyl chloride (PVC), polycarbonate (PC), copolyester, acrylonitrile butadiene styrene copolymer (ABS) or styrene acrylonitrile (SAN), polybutylene terephthalate (PBT); an elastomer, selected from the group of ethylene-propylene-diene monomer (EPDM) and liquid silicone rubber (LSR); a thermoplastic elastomer (TPE), preferably urethane based or as a styrene block copolymer; a multi-component plastic, selected from a mixture of polyethylene (PE) and polypropylene (PP), polypropylene (PP) and a thermoplastic elastomer, polycarbonate and a thermoplastic elastomer, and acrylonitrile butadiene styrene copolymer (ABS) and polypropylene (PP).

As described above, the choice of the synthetic plastic material depends on both the intended application of the valve as well as the cost of its production method. In a specific embodiment the valve is designed as a disposable article, so that the well-known thermoplastics polyethylene or polypropylene are used for such applications just for cost-related reasons alone. In the case of multi-component plastics the desired material properties can be combined. Thus, a multi-component system, in which, inter alia, polybutylene terephthalate (PBT) is used, constitutes a preferred embodiment.

In an additional embodiment the valve is made in the injection molding process, preferably the multi-component injection molding process, by extrusion, by mechanical processing of a plastic blank, preferably by turning and/or milling, or by a prototyping method, selected from the group of vacuum die casting method, 3D printing method, laser sintering or stereolithography.

In this case, too, the choice of the method depends in essence on the choice of the polymer that is used, because not every plastic is equally suitable for every production process. The choice of the synthetic plastic material, in turn, depends largely on the application. In this case the individual loading parameters due to pressure, temperature, mechanical stress, chemical resistance, sterilization and the suitability for certain applications, for example, in the pharmaceutical or medical sector, play a crucial role.

In another embodiment the flow is radial against the valve body. Hence, the pressure in the valve chamber is very evenly distributed over the two seals. As a consequence, this feature also makes it more difficult for the valve body to be blasted out of the valve housing.

In an additional aspect of the present invention the valve is used as a disposable product. Due to the high sterility requirements the so-called "single use" products for the production, in particular, in the pharmaceutical sector, in medicine, and also in the food sector are becoming increasingly more common. With the valve described here, another building block for an automated production process in the disposable system is provided. In order to minimize or even completely eliminate contamination, the valve is not only intended for installation on site, but is also used, in particular, as an integrated component in a closed disposable fluid system, for example, as a valve on filter capsules, filter housings or hybrid systems that are capable of vapor deposition.

In a preferred embodiment the valve can be sterilized, preferably by irradiation sterilization, even more preferably by gamma ray sterilization or electron beam sterilization. In this case the type of sterilization depends on the use of the valve in the composite system and on the degree of sterilization desired on the application side. In the case of the disposable solutions described above, the valve is used as an integrated component, for example, in a filter capsule and is packaged together with this filter capsule as a composite package and then sterilized according to one of the aforementioned processes, for example, through gamma sterilization.

Other embodiments of the invention will become apparent from the drawings, which, however, do not restrict the present invention in any way, but merely serve the purpose of illustrating specific embodiments.

LIST OF REFERENCE NUMERALS

Figure 1:
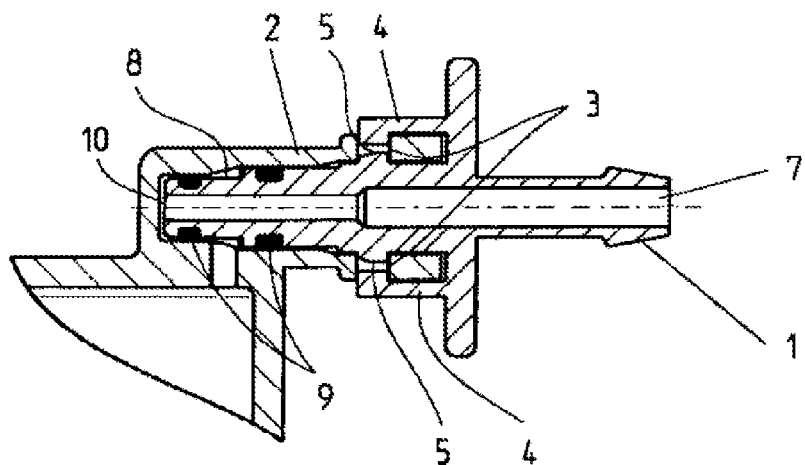
FIG. 1 is a vertical cross sectional view of the closed valve. In this embodiment the valve is integrated into a container as a component, and this container adjoins the valve. The valve body 1 is disposed in the valve housing 2. The auxiliary guide elements 4 engage with the guide grooves 3 from the outside. The additional auxiliary guide elements 5 are opposite the outer auxiliary guide elements from the inside. The valve chamber 8 is formed between the seals 9. The valve connects, via the continuous open valve outlet 7 and the continuous open valve inlet 10 of the valve body 1, the container with attached systems.
Figure 2:
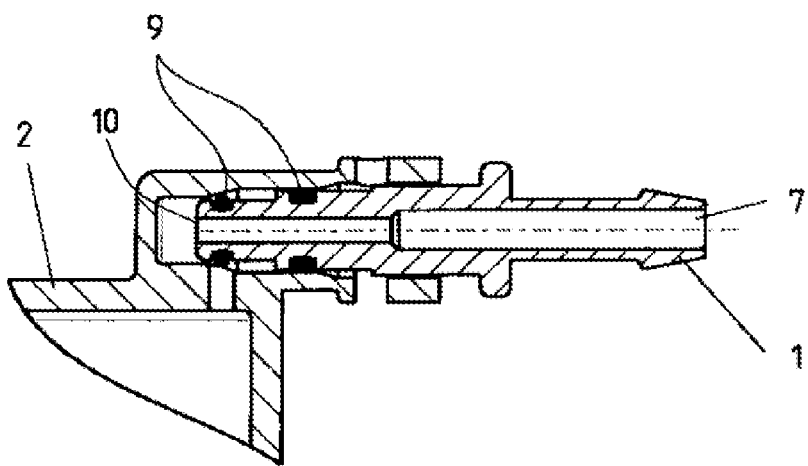
FIG. 2 is a vertical cross sectional view of the opened valve. Here, too, one sees the adjoining valve housing 2 as an integrated component in an adjoining container. As may be further seen, the interior surface of the valve housing 2 defines a hollow space and the valve body 1 is installed in the hollow space of the housing. A hose or tube can be connected to the valve outlet 7. The seals 9 can also be seen. In this case the seal that is located further away from the valve outlet 7 is exposed. Hence, fluid can flow through the valve out of the container or vice versa can flow into the container.
Figure 3:
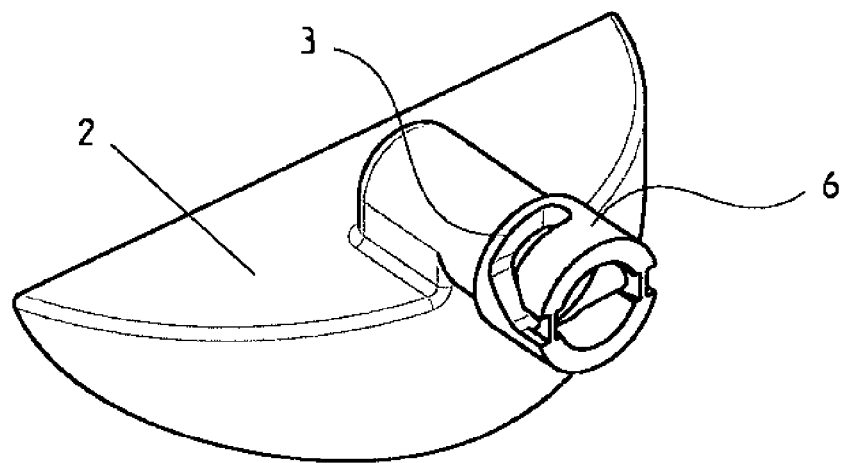
FIG. 3 is a perspective view of the valve housing 2 with the material region 6 that is reinforced continuously around the guide grooves 3.
Figure 4:
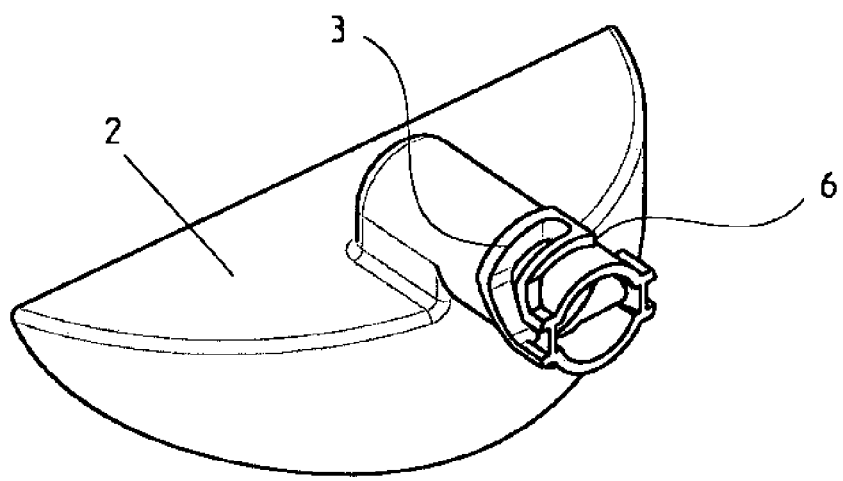
FIG. 4 is also a perspective view of the valve housing 2 with the reinforced material region 6 as an edge around the guide grooves 3.
Figure 5:
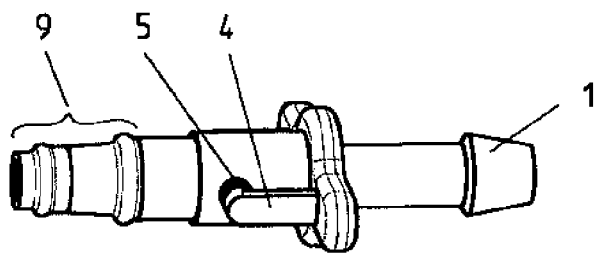
FIG. 5 is a perspective view of the valve body 1 with the auxiliary guide elements 4 shown attached in a cantilevered manner to an exterior surface of the valve body facing the valve inlet. The opposite additional auxiliary guide elements 5, as well as the seals 9, are also shown.
Figure 6:
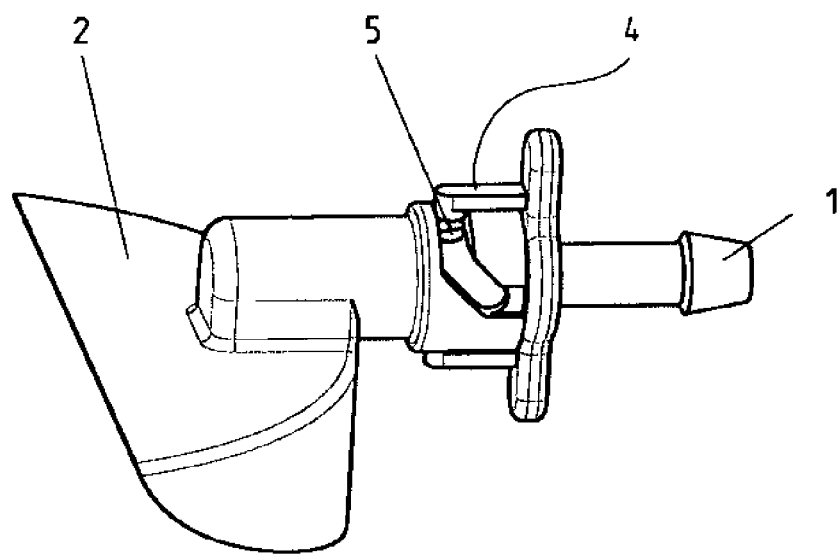
FIG. 6 is a perspective view of the valve body 1 in the valve housing 2. The auxiliary guide elements 4, engaging from the outside, and the additional auxiliary guide elements 5, located inside, are also shown.
Figure 7:
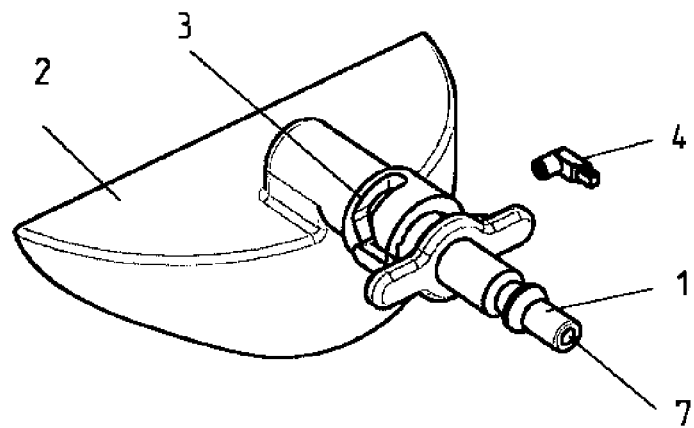
FIG. 7 is a perspective view of the valve with a valve body 1 and two auxiliary guide elements 4, which are attached from the outside and which are mounted on the valve body 1 as clips from the outside through the guide groove 3, after the valve body 1 has been inserted into the valve housing 2. A hose or tube can be connected to the valve outlet 7.
Figure 8:
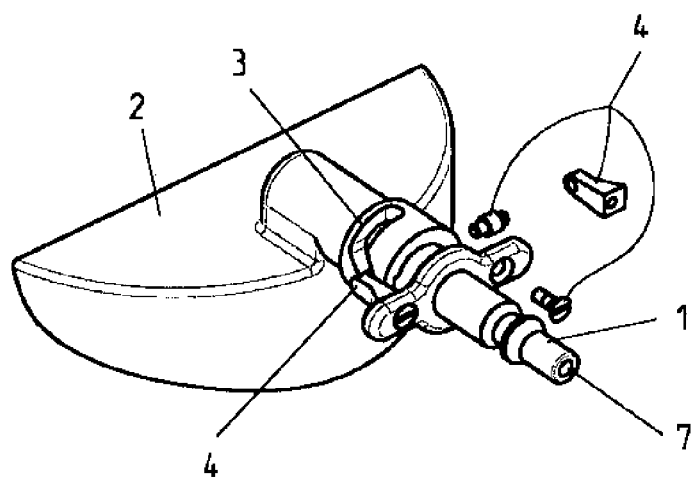
FIG. 8 is a perspective view of the valve with the auxiliary guide elements 4, each consisting of 3 parts, which are screwed to the valve body 1 upon insertion of the valve body 1 into the valve housing 2. A plug connection runs through the guide grooves 3, and this plug connection is also an essential part of the auxiliary guide elements 4 and is connected to the valve body 1. A hose or tube can be connected to the valve outlet 7.

1 valve body
2 valve housing
3 guide grooves
4 auxiliary guide elements
5 additional auxiliary guide elements
6 reinforced material regions
7 valve outlet
8 valve chamber
9 seals

What is claimed is:

1. A valve comprising:
   a valve housing and a longitudinally movable valve body arranged in the valve housing,
   wherein the valve housing has at least two guide grooves, with which auxiliary guide elements, arranged on the valve body, engage on an exterior surface of the valve housing,
   wherein the guide grooves are shaped to define a combined translatory and rotary movement path of the valve body and the auxiliary guide elements when the valve body is moved to open or close the valve,
   wherein the valve body has a valve inlet and a valve outlet coaxial with the valve inlet, each continuously open, and a through bore continuously open from the valve inlet to the valve outlet,
   wherein the valve body has an exterior surface facing the valve inlet, and
   wherein the auxiliary guide elements are configured as levers attached to the exterior surface of the valve body and engage with the guide grooves from outside the valve housing.

2. The valve as claimed in claim 1, wherein the valve body has additional auxiliary guide elements, which engage with the guide grooves on an interior surface of the valve housing, and which are arranged opposite the auxiliary guide elements engaging the valve housing on the exterior surface.

3. The valve as claimed in claim 2, wherein the additional auxiliary guide elements each have a nub shape.

4. The valve as claimed in claim 1, wherein the valve housing has reinforced material regions in areas around the guide grooves.

5. The valve as claimed in claim 1, wherein the auxiliary guide elements are fixedly attached to the exterior surface of the valve body proximate the valve outlet.

6. The valve as claimed in claim 5, wherein the fixed arrangement between the auxiliary guide elements and the valve body is a welded connection, a screw connection, a clip connection or a positive locking connection.

7. The valve as claimed in claim 1, wherein the valve body includes a valve chamber, which is sealed from an ambient atmosphere by two seals when the valve is closed.

8. The valve as claimed in claim 7, wherein the seals are multi-component injection molded parts formed on the valve body.

9. The valve as claimed in claim 7, wherein the valve chamber is sealed from the ambient atmosphere by the two seals such that, when the valve is closed, the seals ensure that the valve chamber is open only towards the interior of the valve housing.

10. The valve as claimed in claim 1,
    wherein the valve body includes a valve chamber sealed from an ambient atmosphere by two seals,
    wherein the valve is configured such that a radial flow is produced in the valve chamber against the valve body, and
    wherein a pressure produced by the radial flow is evenly distributed over the two seals to minimize blasting out of the valve body from the valve housing.

11. The valve as claimed in claim 1, wherein the valve is made of a plastic material.

12. The valve as claimed in claim 1, wherein the valve is configured to produce a radial flow against the valve body.

13. The valve as claimed in claim 1, wherein the valve is designed as a disposable product.

14. The valve as claimed in claim 1, wherein the valve housing has an interior surface and the guide grooves are slots formed as continuous openings extending from the exterior surface to the interior surface of the valve housing.

15. The valve as claimed in claim 1, wherein the auxiliary guide elements are fixedly attached in a cantilevered manner to the exterior surface of the valve body.

16. A valve comprising:
    a valve housing and a longitudinally movable valve body arranged in the valve housing,
    wherein the valve housing has at least two guide grooves, with which auxiliary guide elements, attached to an exterior surface of the valve body, engage on an exterior surface of the valve housing,
    wherein the guide grooves are shaped to define a combined translatory and rotary movement path of the valve body and the auxiliary guide elements when the valve body is moved to open or close the valve,
    wherein the valve body has a longitudinal axis, first and second longitudinally opposed end faces, and a through bore continuously open from the first end face to the second end face,
    wherein the second end face includes a continuously open valve outlet and the first end face includes a continuously open valve inlet axially aligned with the valve outlet along the longitudinal axis of the valve body,
    wherein the valve housing has an interior surface defining a hollow space in which the movable valve body is arranged, and
    wherein the guide grooves are slots formed as continuous openings extending through the valve housing from the exterior surface to the interior surface defining the hollow space of the valve housing.

17. The valve as claimed in claim 16, wherein the valve body includes a valve chamber, which is sealed from an ambient atmosphere by two seals when the valve is closed.

18. The valve as claimed in claim 17, wherein the valve chamber is sealed from the ambient atmosphere by the two seals such that, when the valve is closed, the seals ensure that the valve chamber is open only towards the interior of the valve housing.

19. The valve as claimed in claim 16,
    wherein the valve body includes a valve chamber sealed from an ambient atmosphere by two seals,
    wherein the valve is configured such that a radial flow is produced in the valve chamber against the valve body, and wherein a pressure produced by the radial flow is evenly distributed over the two seals to minimize blasting out of the valve body from the valve housing.

20. A valve comprising:

a valve housing and a longitudinally movable valve body arranged in the valve housing, wherein the valve housing has at least two guide grooves, with which auxiliary guide elements, arranged on the valve body, engage on an exterior surface of the valve housing, wherein the guide grooves are shaped to define a combined translatory and rotary movement path of the valve body and the auxiliary guide elements when the valve body is moved to open or close the valve, wherein the valve body has a valve inlet and a valve outlet coaxial with the valve inlet, each continuously open, and a through bore continuously open from the valve inlet to the valve outlet, wherein the valve body further has an exterior surface facing the valve inlet, wherein the auxiliary guide elements are attached to the exterior surface the valve body, wherein the valve housing has an interior surface defining a hollow space in which the movable valve body is arranged, and wherein the guide grooves are slots formed as continuous openings extending through the valve housing from the exterior surface to the interior surface defining the hollow space of the valve housing.

* * * * *